US012186926B2

(12) United States Patent
Coresh

(10) Patent No.: US 12,186,926 B2
(45) Date of Patent: Jan. 7, 2025

(54) RECIPROCATING RAZOR HAVING BLADES COUPLED BY LINKAGES THAT BEND AROUND STATIONARY PIVOT POINTS

(71) Applicant: Leon Coresh, Tel Aviv (IL)

(72) Inventor: Leon Coresh, Tel Aviv (IL)

( * ) Notice: Subject to any disclaimer, the term of this patent is extended or adjusted under 35 U.S.C. 154(b) by 0 days.

(21) Appl. No.: 18/402,902

(22) Filed: Jan. 3, 2024

(65) Prior Publication Data

US 2024/0139981 A1 May 2, 2024

Related U.S. Application Data

(63) Continuation of application No. 17/671,850, filed on Feb. 15, 2022, now Pat. No. 11,897,153, which is a continuation of application No. 16/672,863, filed on Nov. 4, 2019, now Pat. No. 11,254,023, which is a continuation of application No. 15/972,765, filed on May 7, 2018, now Pat. No. 10,500,746.

(51) Int. Cl.

*B26B 21/38* (2006.01)
*B26B 21/22* (2006.01)
*B26B 21/40* (2006.01)
*B26B 21/44* (2006.01)

(52) U.S. Cl.

CPC ............ *B26B 21/38* (2013.01); *B26B 21/227* (2013.01); *B26B 21/4012* (2013.01); *B26B 21/405* (2013.01); *B26B 21/4068* (2013.01); *B26B 21/443* (2013.01)

(58) Field of Classification Search

CPC ... B26B 21/227; B26B 21/38; B26B 21/4012; B26B 21/405; B26B 21/4068; B26B 21/443

USPC ................................ 30/43.91, 43.92, 47–51

See application file for complete search history.

(56) References Cited

U.S. PATENT DOCUMENTS

| | | | |
|---|---|---|---|
| 5,152,064 | A | 10/1992 | Johnston |
| D343,922 | S | 2/1994 | Ahlgren |
| 5,307,564 | A | 5/1994 | Schoenberg |
| 5,504,997 | A | 4/1996 | Lee |
| 5,732,470 | A | 3/1998 | Labarbara |
| 5,794,342 | A | 8/1998 | Davey |
| D423,143 | S | 4/2000 | Cowell |
| 6,161,288 | A | 12/2000 | Andrews |
| 6,173,498 | B1 | 1/2001 | Warrick et al. |
| 6,430,814 | B1 | 8/2002 | Solow |
| 6,434,828 | B1 | 8/2002 | Andrews |
| 6,442,840 | B2 | 9/2002 | Zucker |

(Continued)

FOREIGN PATENT DOCUMENTS

| | | |
|---|---|---|
| CA | 2731538 | 1/2010 |
| CA | 2942900 | 9/2015 |

(Continued)

*Primary Examiner* — Jason Daniel Prone

(74) *Attorney, Agent, or Firm* — Thomas Coester Intellectual Property

(57) ABSTRACT

A shaving razor. A first and second blade assembly each have a cutting edge oriented to shave in the same direction. The first and second blade assemblies are each displaceable along a respective first and second path substantially parallel to their cutting edge. First and second linkages couple together a first ends and second ends respectively of the first and second blade assembly. Stationary element provide pivot points around which the linkages bend. Other embodiments are also described and claimed.

7 Claims, 4 Drawing Sheets

(56) References Cited

U.S. PATENT DOCUMENTS

| | | | |
|---|---|---|---|
| 6,502,312 B2 | 1/2003 | Beutel | |
| 7,024,776 B2 | 4/2006 | Wain | |
| 7,086,160 B2 | 8/2006 | Coffin | |
| 7,131,203 B2 | 11/2006 | Wain | |
| 7,797,834 B2 | 9/2010 | Steunenberg | |
| 8,024,863 B2 | 9/2011 | Wain | |
| 8,205,344 B2 | 6/2012 | Stevens | |
| 8,479,398 B2 | 7/2013 | Coresh | |
| 8,484,852 B2 | 7/2013 | King | |
| 8,595,940 B2 | 12/2013 | Coresh | |
| 8,640,342 B2 | 2/2014 | Murgida | |
| 8,707,561 B1 | 4/2014 | Kneier | |
| 8,726,517 B2 | 5/2014 | Lau | |
| 9,144,914 B2 | 9/2015 | Coresh | |
| 9,457,486 B2 | 10/2016 | Coresh | |
| 9,616,584 B2 | 4/2017 | Coresh | |
| 9,630,332 B2 | 4/2017 | Coresh | |
| 9,821,480 B2 | 11/2017 | Coresh | |
| 10,112,313 B2 | 10/2018 | Robertson | |
| 10,357,891 B2 | 7/2019 | Coresh | |
| 10,500,746 B2 | 12/2019 | Coresh | |
| 10,775,849 B2 | 9/2020 | Fujimoto | |
| RE48,701 E | 8/2021 | Coresh | |
| 11,167,437 B2 * | 11/2021 | Coresh | B26B 21/38 |
| 11,254,023 B2 | 2/2022 | Coresh | |
| 11,541,560 B2 | 1/2023 | Coresh | |
| RE49,843 E * | 2/2024 | Coresh | B26B 21/38 |
| 11,897,153 B2 * | 2/2024 | Coresh | B26B 21/38 |
| 2004/0020053 A1 | 2/2004 | Wain | |
| 2005/0188540 A1 | 9/2005 | Kelly | |
| 2006/0064875 A1 | 3/2006 | Follo | |
| 2007/0220753 A1 | 9/2007 | Aviza | |
| 2008/0034592 A1 | 2/2008 | Smith et al. | |
| 2008/0148574 A1 | 6/2008 | Chou | |
| 2008/0196251 A1 | 8/2008 | Royle | |
| 2012/0151772 A1 | 6/2012 | Moon | |
| 2013/0000127 A1 | 1/2013 | Coresh | |
| 2013/0160296 A1 | 6/2013 | Park et al. | |
| 2014/0102271 A1 | 4/2014 | Krenik | |
| 2014/0182138 A1 | 7/2014 | Krenik | |
| 2014/0259676 A1 | 9/2014 | Chou | |
| 2014/0259677 A1 | 9/2014 | Coresh | |
| 2015/0266192 A1 | 9/2015 | Coresh | |
| 2016/0001454 A1 | 1/2016 | Coresh | |
| 2016/0121496 A1 | 5/2016 | Johnson | |
| 2018/0304483 A1 | 10/2018 | Lev | |
| 2018/0361603 A1 | 12/2018 | Griffin | |
| 2019/0270210 A1 | 9/2019 | Coresh | |
| 2021/0162614 A1 | 6/2021 | Coresh | |

FOREIGN PATENT DOCUMENTS

| | | |
|---|---|---|
| GB | 184913 A | 8/1922 |
| GB | 290796 A | 5/1928 |
| GB | 2462086 | 1/2010 |
| KR | 20140053107 | 5/2014 |
| WO | 2010010517 | 1/2010 |
| WO | 2013003484 | 1/2013 |
| WO | 2015142526 | 9/2015 |
| WO | 2016053664 | 4/2016 |

* cited by examiner

RECIPROCATING RAZOR HAVING BLADES COUPLED BY LINKAGES THAT BEND AROUND STATIONARY PIVOT POINTS

CROSS-REFERENCE TO RELATED APPLICATION

This application is a continuation of U.S. patent application Ser. No. 17/671,850 entitled "Reciprocating Razor Having Blades Linked to Facilitate Oppositely Directed Movement" now U.S. Pat. No. 11,897,153 which is a continuation of U.S. patent application Ser. No. 16/672,863 filed Nov. 4, 2019 entitled "Linkage for Reciprocating Razor" now U.S. Pat. No. 11,254,023 which is a continuation of U.S. patent application Ser. No. 15/972,765 filed May 7, 2018, entitled "Reciprocating Razor with Living Hinge Interconnections" now U.S. Pat. No. 10,500,746.

BACKGROUND

Field

Embodiments of the invention relate to a shaving razor. More particularly, embodiments of the invention relate to a shaving razor having reciprocating blades.

Background

There are two main classes of shaving razors that dominate the market. There are electric razors, which have one or more cutting implements behind a screen or other protective barrier, where the cutting elements are powered to, for example, spin such that hair penetrating the screen or barrier is cut. The advantage of these types of razors is after the initial purchase, a large number of shaves are possible without replacing the device or parts thereof. Unfortunately, electric razors are typically somewhat bulky, making it difficult to get into tight spaces, for example, around a user's nose. Additionally, even in open spaces such as a user's cheek, the closeness of the shave generally does not match that which is possible with exposed-blade razors. This lack of closeness is due at least impart to the dimension of the barrier. Even relatively thin micro-screens have a thickness that dictates the maximum closeness of the shave. That is, the shave can be no closer than the thickness of the screen.

The second class of razors in common use today is exposed-blade razors, which have one or more blades arranged in a cartridge. A user pulls the cartridge across the area to be shaved, and the blades provide a shave that is generally closer than possible with an electric razor, owing to the fact that the blades are in direct contact with the user's skin and the dimension of the protective shield of the electric razors need not be accommodated. Commonly, three, four, or even five blades are aligned to cut in the same shaving direction. Even where multiple blades are present, the leading blade performs the most of the cutting. As used herein, "leading" when modifying blade refers to the first blade to come in contact with the hair in the direction of shaving. As a result, the leading blade dulls more quickly than the other blades. Often, the dullness of the leading blade requires replacement of the cartridge while the remaining blades are perfectly serviceable.

Some razor manufacturers have come up with "power" models of their exposed blade razors. These razors include a battery in the handle and a motor with an eccentric mass such that when powered, the entire razor vibrates. In these models, the blades do not actually move; rather, the entire device vibrates. This feature has been heavily advertised, but market research reflects that it fails to provide any real benefit to the user, and the majority of users do not replace the battery once it goes dead. Studies have not revealed that power models have longer cartridge life or improved cutting efficacy over the unpowered models. Rather, these "power" exposed blade razors appear to be little more than a marketing gimmick.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration.

Figure 1:
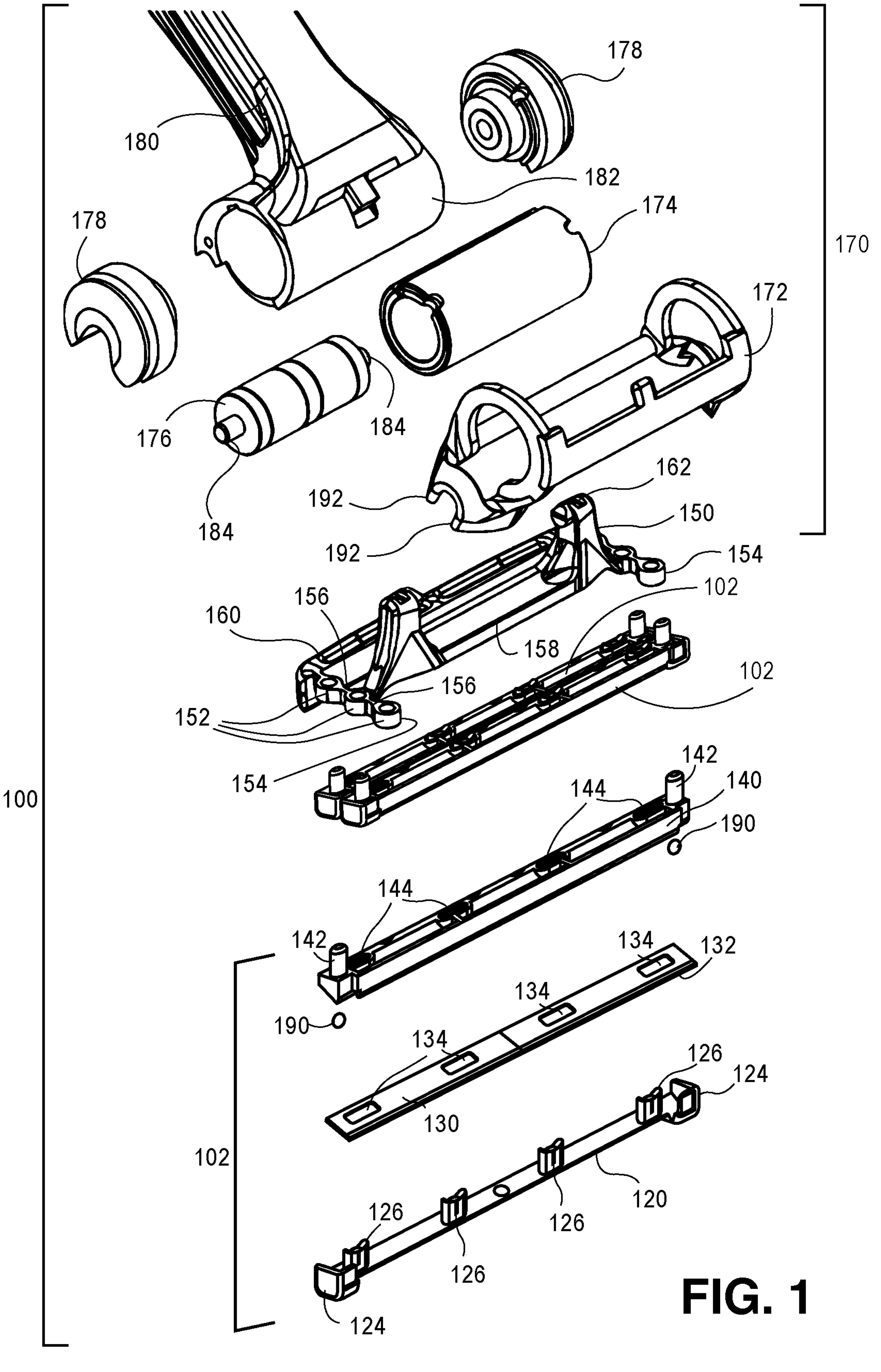
FIG. 1 is an exploded view of a shaving razor of one embodiment of the invention.

FIG. 1 is an exploded view of a shaving razor of one embodiment of the invention. Shaving razor 100 is made up of a handle 180, an actuator assembly 170, a bridge 150 and a plurality of blade assemblies 102 that couple to the bridge 150. While three blade assemblies 102 are shown, more or fewer blade assemblies 102 are within the scope and contemplation of embodiments of the invention. For example, two, four or five blade assemblies 102 could be used in various embodiments of the invention. Distal end 182 (the shaving end) of handle 180 is formed to receive actuator assembly 170. Actuator assembly 170 is used to drive and control reciprocation of the blade assemblies 102.

In one embodiment, actuator assembly 170 includes an armature housing 174, an armature 176, a pair of bushing containing end caps 178 and an actuator support 172. Armature 176 has dual shafts 184 and, in use, applies force to the bridge 150 to cause reciprocating motion of the blades as described more fully below. As it translates back and forth is applies a force on the bridge 150. In one embodiment the armature housing 174 and armature 176 uses a voice coil principle to move the shaft 184 back and forth in a reciprocating motion. In this context, by rapidly changing direction of the magnetic flux in the voice coil, the relative range of motion of the blade assemblies 102 can be precisely controlled. As discussed below the desirable relative movement is in the range of 0.1 to 0.5 mm. While the material properties of the bridge and the possible force output of the armature also limit the range of motion, precise control is accomplished by managing the direction of magnetic flux in the voice coil. Armature 176 resides within armature housing 174. The armature housing 174 then resides within a void defined by distal end 182 of handle 180. Actuator support 172 is molded to engage distal end 182 and retain armature housing 174 within the void. Actuator support 172 may also have molded as part thereof stops 192 that is a part of kinematic scheme allowing reciprocating motion as described more fully below.

Bridge 150 is molded to have a yoke 158 that spans between two linkages 154 on to which blade assemblies 102 may be installed. Bridge 150 also includes a leading platform 160 that extends from a front edge of linkages 154 and coupled the linkages 154 together. Leading platform 160 moves with the leading blade assembly 102. As used herein, "leading" refers to earlier in position relative to the direction of shaving.

Linkages 154 are molded to define a plurality of bores 152. The number of bores 158 in each linkage 154 is dictated by the number of blade assemblies 102 desired to be part of the shaving head 100. Linkages 154 are also molded to have a living hinge 156 between each pair of blade assembly attachment bores 152. Thus, in this example, each linkage 154 includes two living hinges 156, one after the bores for installation of the leading blade assemble, i.e. between the front most and second blade assembly, and one between the second (center) blade assembly and the third blade assembly. The living hinges 156 can be formed by having relatively thin material of the same type as forms the remainder of the bridge 150 or can be formed using double molding and employing a second more flexible material. In general, the number of living hinges in a linkage of the various embodiments should be equal to n−1 where n is the number of blade assemblies in the razor head.

Bridge 150 also defines a handle attachment mechanism 162 that permits selective coupling of the razor head to handle 180 and in particular engagement of the yoke by the actuator assembly 170 and more specifically by actuator shaft 184. While one possible handle arrangement is shown, other shapes and form factors are deemed to be within the scope and contemplation of different embodiments of the invention.

Yoke 158 is molded to join the linkages 154 adjacent to at least one of the plurality of bores 152. In the shown embodiment, yoke 158 couples to the linkages 154 adjacent to the center bore 152 of the three bores 152. In an alternative embodiment having e.g. four or five blade assemblies, the yoke end might have a horseshoe shape to couple to the linkages adjacent the e.g. the second and fourth blade assemblies. Yoke 156 is formed of a substantially rigid mechanical structure or may be molded in more rigid (relative to the linkages 154) material such as glass fiber impregnated plastics in case of double molding.

Blade assembly 102 has three primary parts, a razor blade 130, a cover 120 and a base 140. The cover 120 is unitarily molded as a single unit. The blade 130 has a cutting edge 132 and defines either a plurality of voids 134. It is within the scope and contemplation of embodiments of the invention to use blades with more or fewer voids 134 than shown. If fewer or more pins are used fewer or more voids can be defined.

The cover 120 has formed as part thereof a plurality of deformable pins 126 that pass through the voids 134 of the blade 130. The cover 120 also has formed as part thereof end caps 124 at either longitudinal end of the cover 120. In one embodiment, the end caps 124 have a generally L shaped cross section. In one embodiment, the short leg of the L provides a hard stop that prevents forward movement of the blade 130 once installed over the pins 126. By holding the blade 130 against the hard stops during manufacture constant cutting edge location is achieved independent of inconsistences that may arise in the manufacture of the blade itself. For example, the relative distance between the cutting edge and the voids may be different between two blades owing to the fact that the edge is typically ground after the voids are punched. Precision molding of the hard stops permits significant tolerance in the blade production including both the edge and the voids without negatively impacting the precision of the finished assembly.

The base 140 is unitarily molded to define a plurality of voids 144 to receive pins 126. Base 140 may also optionally be molded to define one or more sacrificial electrode pockets to receive sacrificial electrodes 190. In one embodiment, the sacrificial electrodes 190 are aluminum spheres and the pockets are defined to be of a size that the sphere will pressure fit within the pocket. In one embodiment, the sphere has a diameter of 1 mm. Other shapes of sacrificial electrodes are also contemplated including but not limited to rectangular solids, toroids, discs and the like. Other embodiments may have the electrode pockets molded into the cover 120, but it is believed that ease of manufacture is enhanced with the electrodes 190 residing in the base 140. Molded as part of base 140 are a pair of deformable pegs 142, which during assembly pass through the bores 152 of linkages 154.

To assemble blade assembly 102, the cover 120 is held in a fixture and the blade 130 is inserted such that the pins 126 pass through voids 134 in the blade 130. The hard stops 124 in conjunction with the pins 126 force the blade into a precise position. The sacrificial electrodes 190 (if present in the embodiment) are pressure fit into pockets in the base 140 and the base 140 is overlaid on the cover-blade combination such that the pins 126 pass through the voids 144 in the base 140. Pressure is applied to pins 126 to drive them into the plastic range of the material used such that the pins 126 are permanently deformed and hold the assembly 102 together as a unit. Notably, unlike prior art razor assemblies that often relied on heat welding or similar processes, here, no heat processing is required for assembly. The final position of the blade is achieved when the sandwich of the cover, blade and base is compressed. The hard stops 124 ensure precision and consistency between blade assemblies. While the foregoing blade assemblies 102 are cost effective and efficient to manufacture, practice of embodiments of the invention are not limited to that particular construction or arrangement. Generally, any individual independent blade assemblies that can be installed on the linkages 154 could be used.

Figure 2:
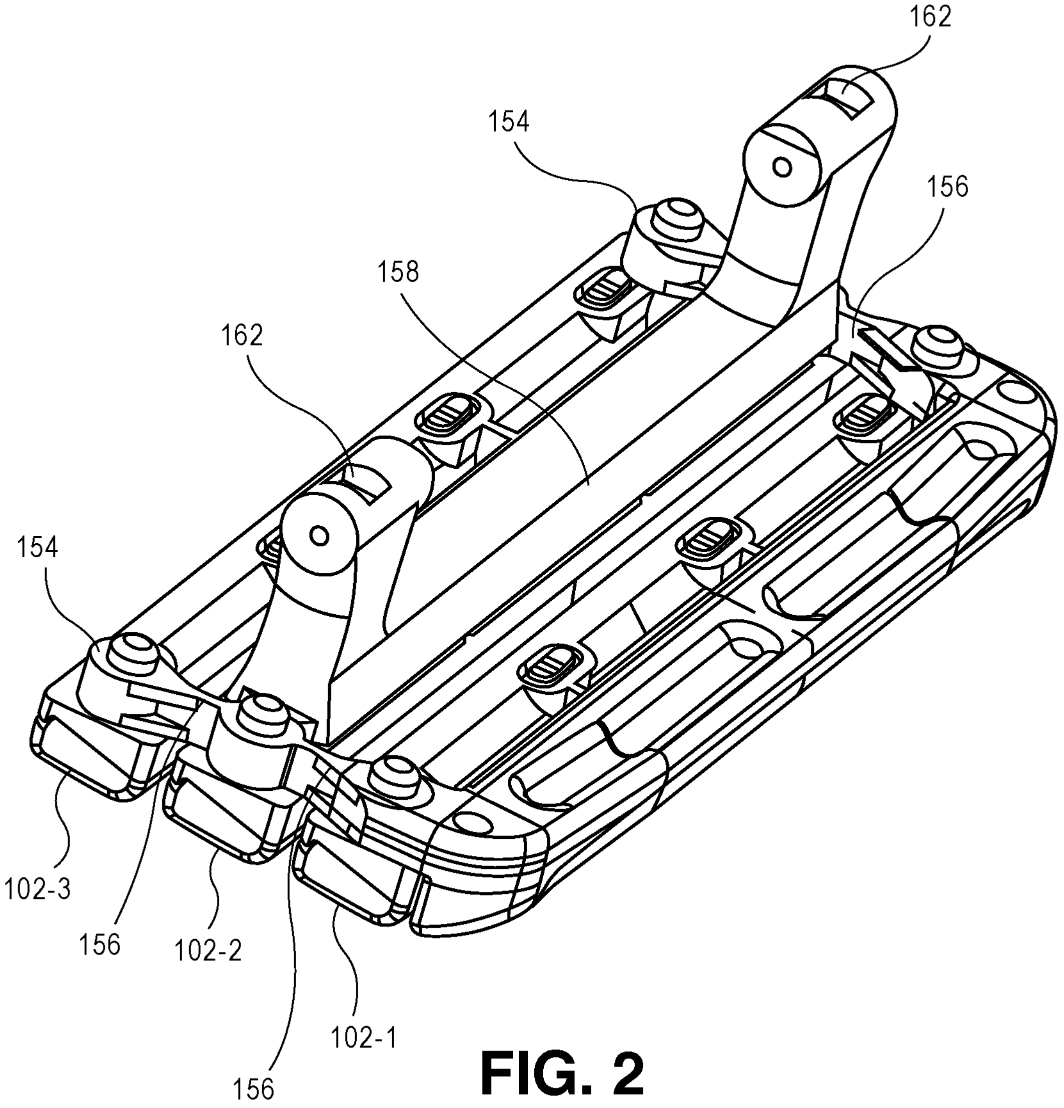
FIG. 2 is a rear view of the shaving head disconnected from the handle.

FIG. 2 is a rear view of the shaving head disconnected from the handle. In the shown embodiment, three independent blade assemblies 102-1, 102-2 and 102-3 are coupled to linkages 154. The linkages 154 are molded to have a living hinge 156 between each pair of blades. When handle attachment mechanism 162 couples to handle 180, the stops 192 reside in intimate and continuous contact with the interior side of the living hinges 156. The yoke 158 (which in use is driven by the actuator assembly) attaches to the linkages 154 adjacent to center blade assembly 102-2.

Figure 3A:
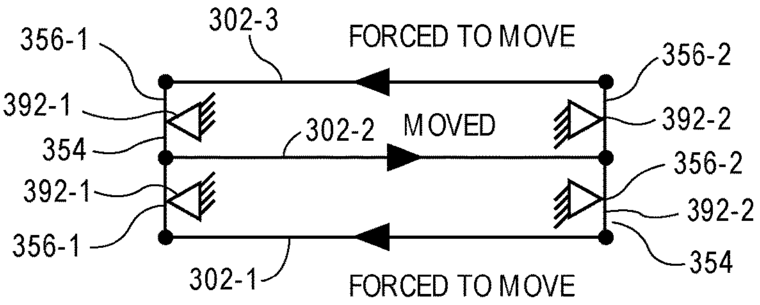
FIG. 3A is a schematic explanation of the movement principle employed in embodiments of the invention.

FIG. 3A is a schematic explanation of the movement principle employed in embodiments of the invention. Three rigid members 302-1, 302-2, and 302-3 (generically 302) (corresponding to three blade assemblies) couple between a pair of linkages 354. The linkages have flexible regions 356-1 and 356-2 (right and left linkage respectively) between the attachment points of the rigid members 302. In use stops 392-1, 392-2 are positioned in contact with flexible regions 356-1 and 356-2 respectively when no force is applied to any rigid member 302. In one embodiment, when force is applied to rigid member 302-2 e.g. in a right ward direction in the figure, that rigid member 302-2 moves to the right. The flexible regions 356-1 act against stops 392-1 and hinge causing the rigid members 302-1 and 302-3 to move in the opposite direction (to the left in the figure) with the same amplitude as the movement of the rigid member 301-2. Concurrently, the flexible regions 356-2 flex around stops 392-2 to allow the movement. The stops 356-1, 356-2 collectively along with the material properties (elasticity) of the linkages 354 limits the total range of motion of the members relative to each other. It has been found that relative motion in excess of 0.5 mm increases the risk of nicks and cuts for the user. It has also been found that a range of motion less than 0.1 mm fails to provide the desired utility. Thus, the range of motion between 0.1 and 0.5 mm is desirable (a reduced upper bound provides an additional safety margin), and 0.2 mm has been found satisfactory.

Figure 3B:
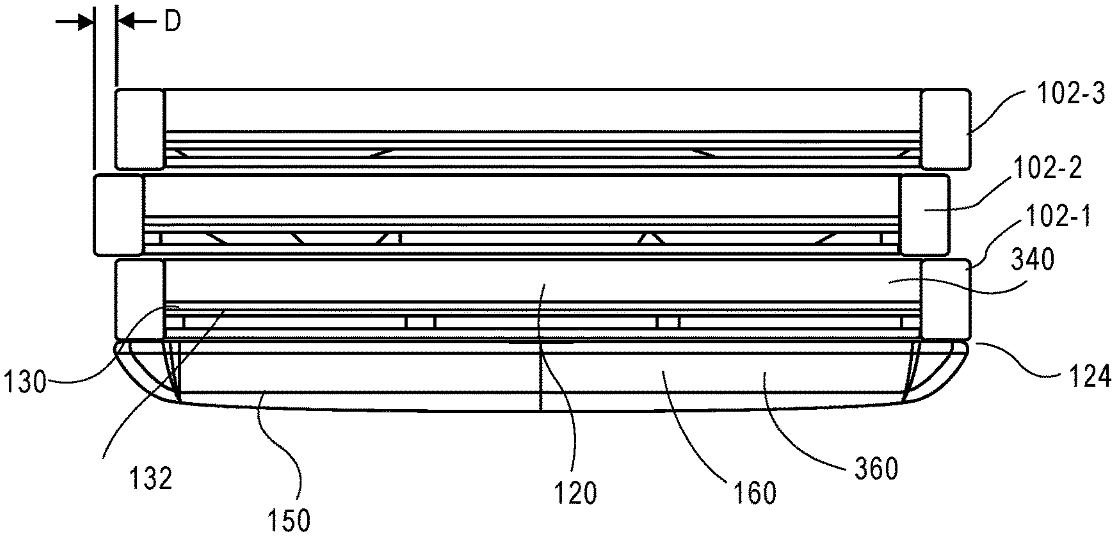
FIGS. 3B and 3C show a plan view of the razor face of one embodiment of the invention with the driven blade assembly driven to the left and right respectively.
Figure 3C:
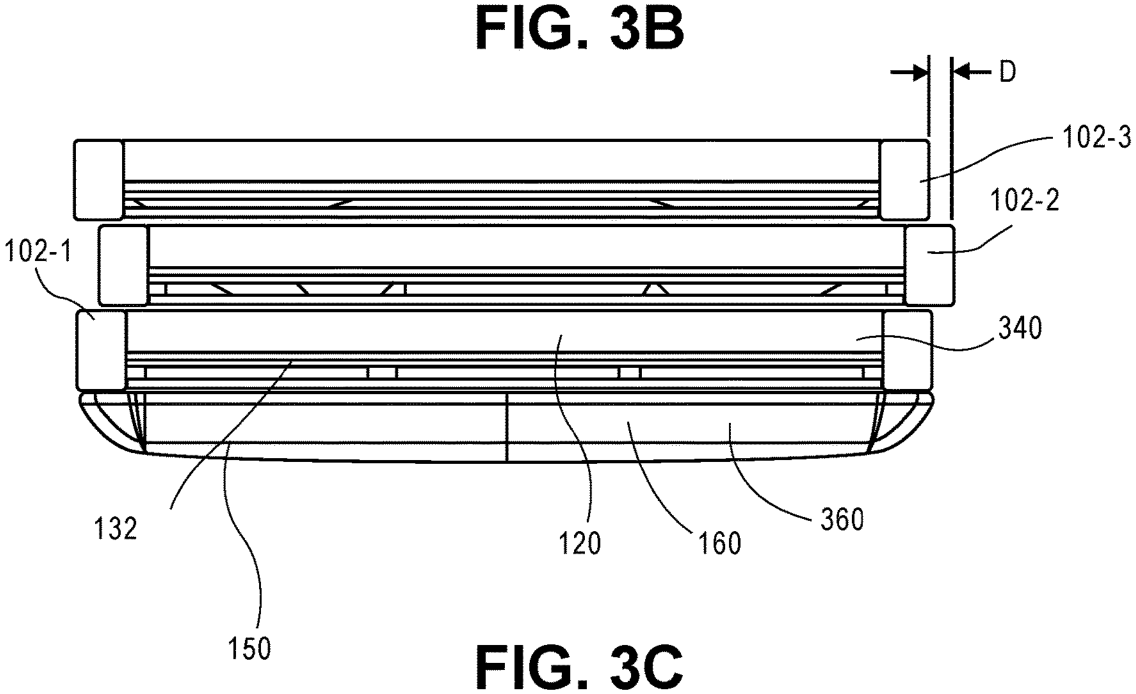

FIGS. 3B and 3C show a plan view of the razor face of one embodiment of the invention with the driven blade assembly driven to the left and right respectively. In this embodiment, three identical blade assemblies 102-1, 102-2, 102-3 are coupled to bridge 150. As seen in this view, the leading platform 160 has a skin contact surface 360. As used herein, "skin contact surface" mean the area of the respective part that is expected to come in contact with a user's skin in the shaving path (aligned with the cutting edge of the blade) during normal use. Each cover 120 also has a skin contact surface. Particularly, the surface 340 that runs along razor blade 130 and lags cutting edge 132 is exposed in the shaving path and expected to contact a user's skin during shaving. In various embodiments, these skin contact surfaces may be textured to increase the glide of the shaving head or may have lubricating strips applied thereto to increase the glide.

As discussed with reference to FIG. 3A, in one embodiment an actuator drives blade assembly 102-2 to the left (FIG. 3B), the living hinges (156 in FIG. 1) flex around the stops (192 in FIG. 1) causing the other two blade assemblies 102-1 and 102-3 to move to the right. As the total displacement is defined as distance D, each blade assembly moves ½ D relative to a rest position, as noted above, it is desirable that D be in the range of 0.1 mm to 0.5 mm, and preferably in the range of 0.1 to 0.3. Thus, the actuator and stops are configured to force the movement of the driven blade assembly (102-2) to be in the range of 0.05 to 0.25 mm in one direction from the rest position (the position when no force is applied).

FIG. 3C shows the driven blade assembly 102-2 driven to the right, with a corresponding leftward forced motion for the adjacent blade assemblies 102-1 and 102-3. The same range of motion applies as in FIG. 3B, thus the total range of motion of the driven blade is D; ½ D to the left and ½ D to the right. As previously discussed, the stops 192 are important both for providing leverage against the flexible region. It should be noted that the stops need not be formed as part of the actuator support. For example, the stops could be molded as extensions from the distal end 182 of handle 180. It is only required that the stops provide the necessary point of reaction e.g. pivot point that causes the reciprocating motion between adjacent blade assemblies 102 responsive to the force applied by the actuator. Thus, this and other form factors are also within the scope and contemplation of the invention.

Figure 4:
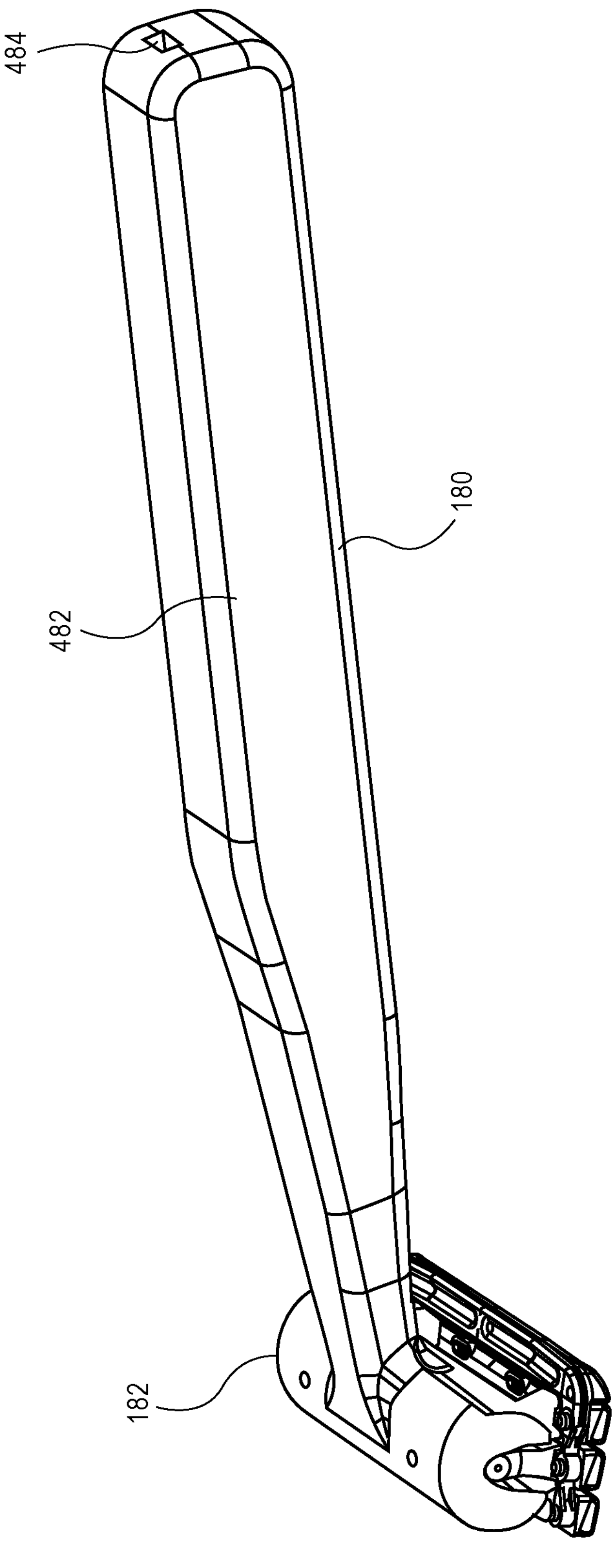
FIG. 4 is a view of the shaving assemble and handle of one embodiment of the invention.

FIG. 4 is a view of the shaving assembly and handle of one embodiment of the invention. Handle 180 has a shaft 482 that may contain power source such as a battery. In one embodiment, a single AAA battery is used. In other embodiments, a rechargeable battery, such as a lithium ion battery, may be employed. In a rechargeable embodiment, a power port 484 may be provided. In other embodiments, such as wet shave embodiments, the rechargeable battery may be induction charged without an explicit power port. The power source powers the actuator within distal end 182 of handle 180. The actuator then applies force to the shaving head as described above.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A shaving razor comprising:

a first blade assembly having a first razor blade with a first cutting edge, the first blade assembly displaceable along a first path substantially parallel to the first cutting edge;

a second blade assembly having a second razor blade with a second cutting edge, the second blade assembly deployed to cut in a same direction as the first blade assembly and to be displaceable along a second path substantially parallel to the second cutting edge;

a first linkage coupling together a first end of the first blade assembly with a first end of the second blade assembly; and a second linkage coupling together a second end of the first blade assembly with a second end of the second blade assembly;

first and second stationary elements that respectively engage the first linkage and the second linkage between the first blade assembly and the second blade assembly to each define a pivot point about which the respective linkage bends responsive to lateral movement of either one of the blade assemblies.

2. The shaving razor of claim 1 further comprising:

a third blade assembly having a third razor blade with a third cutting edge, the third blade assembly deployed for cutting in a same direction as one of the first and second blade assemblies and being displaceable along a third path substantially parallel to the third cutting edge; and wherein a first end of the third blade assembly is coupled to the first linkage and a second end of the third blade assembly is coupled to the second linkage; and wherein the first and second linkages are configured such that the displacement of the first blade assembly along the first path in the first direction causes a displacement of the third blade assembly along the third path in a same direction as one of the first blade assembly and the second blade assembly.

3. The Shaving razor of claim 2 further comprising:

a third and fourth stationary elements that respectively engage the first linkage and the second linkage between the third blade assembly and either there first blade assembly and the second blade assembly to each define a pivot point about which the respective linkage bends responsive to lateral movement of any one of the blade assemblies.

4. The shaving razor of claim 1 further comprising:

a handle; and an actuator coupled to the handle to displace the first blade assembly.

5. The shaving razor of claim 1 wherein an amplitude of the displacement in a first direction along the first path is substantially equal to an amplitude of the displacement in an opposite direction along the second path.

6. The shaving razor of claim 1 wherein an amplitudes of displacement along either the first path or the second path is in a range of 0.1 to 0.5 mm.

7. The shaving razor of claim 1 wherein the first and second blade assemblies reside centrally aligned in a rest position when no force is applied and are, in use, displaced no more than 0.25 mm in any direction from the rest position.

* * * * *